US012552038B1

(12) United States Patent
Zahedi et al.

(10) Patent No.: US 12,552,038 B1
(45) Date of Patent: Feb. 17, 2026

(54) PASSIVITY FRAMEWORK FOR IMPROVING STABILITY IN ROBOT-HUMAN INTERACTIONS

(71) Applicant: Honda Motor Co., Ltd., Tokyo (JP)

(72) Inventors: Fatemeh Zahedi, Tempe, AZ (US); Rana Soltani Zarrin, Los Gatos, CA (US)

(73) Assignee: Honda Motor Co., Ltd., Tokyo (JP)

( * ) Notice: Subject to any disclaimer, the term of this patent is extended or adjusted under 35 U.S.C. 154(b) by 203 days.

(21) Appl. No.: 18/428,219

(22) Filed: Jan. 31, 2024

Related U.S. Application Data

(60) Provisional application No. 63/593,861, filed on Oct. 27, 2023.

(51) Int. Cl.
*B25J 9/16* (2006.01)
*B25J 11/00* (2006.01)

(52) U.S. Cl.
CPC .......... *B25J 9/1689* (2013.01); *B25J 9/1633* (2013.01); *B25J 11/008* (2013.01)

(58) Field of Classification Search
CPC ....... B25J 9/1689; B25J 9/1633; B25J 11/008
See application file for complete search history.

(56) References Cited

U.S. PATENT DOCUMENTS

| | | | | |
|---|---|---|---|---|
| 5,086,400 A * | 2/1992 | Hayati | ................... | B25J 9/1689 901/6 |
| 2019/0143530 A1* | 5/2019 | Masuda | .................. | B25J 5/007 700/245 |
| 2021/0031358 A1* | 2/2021 | Sakaino | ..................... | B25J 3/00 |
| 2022/0371186 A1* | 11/2022 | Zhang | ..................... | B25J 9/0084 |
| 2025/0176829 A1* | 6/2025 | Mason | ................... | G16H 80/00 |

OTHER PUBLICATIONS

Y. Michel, C. Ott and D. Lee, "Safety-Aware Hierarchical Passivity-Based Variable Compliance Control for Redundant Manipulators," in IEEE Transactions on Robotics, vol. 38, No. 6, pp. 3899-3916, Dec. 2022, doi: 10.1109/TRO.2022.3174478. (Year: 2022).*

Ryu et al., "A passive bilateral control scheme for a teleoperator with time-varying communication delay," Mechatronics 20 (2010) pp. 812-823.

Franken et al., Bilateral Telemanipulation With Time Delays: A Two-Layer Approach Combining Passivity and Transparency, IEEE Transactions on Robotics, vol. 27, No. 4, Aug. 2011, pp. 741-756.

(Continued)

*Primary Examiner* — Abby Lin
*Assistant Examiner* — Danielle M Jackson
(74) *Attorney, Agent, or Firm* — Plumsea Law Group, LLC

(57) ABSTRACT

Systems and methods for passive robot-mediated physical human-human interaction using hierarchical constraints. The system enforces constraints on both sides of a bilateral physical interaction with different priorities on each side in the presence of time-varying destabilizing factors such as control system limitations, human variability, hard contacts, relaxed user grasps, stiff control settings, and/or communication delays. A hierarchical optimization framework is provided to satisfy these constraints. A back-up passivity control may also be included to ensure optimization at both sides.

20 Claims, 11 Drawing Sheets

(56) References Cited

OTHER PUBLICATIONS

Anderson and Spong, "Bilateral Control of Teleoperators With Time Delay," IEEE Xplore, Downloaded Jan. 22, 2024, pp. 131-138.
Gaz et al., "Dynamic Identification of the Franka Emika Panda Robot With Retrieval of Feasible Parameters Using Penalty-Based Optimization," IEEE Robotics and Automation Letters, 2019, 4 (4), pp. 4147-4154. hal-02265293.
Kaplish and Yamane, "Motion Retargeting and Control for Teleoperated Physical Human-Robot Interaction," 2019 IEEE-RAS 19th International Conference on Humanoid Robots (Humanoids). Toronto, Canada. Oct. 15-17, 2019. pp. 747-754.
"Robots and robotic devices—Safety requirements for personal care robots," International Standard ISO 13482, Feb. 1, 2014, 86 pp.
Kim and Ryu, "Robustly Stable Haptic Interaction Control using an Energy-bounding Algorithm," The International Journal of Robotics Research, vol. 29, No. 6, May 2010, pp. 666-679.
Niemeyer and Slotine, "Telemanipulation with Time Delays," The International Journal of Robotics Research, vol. 23, No. 9, © 2004 Sage Publications, pp. 873-890.
Stellato et al., "OSQP: An Operator Splitting Solver for Quadratic Programs," Feb. 13, 2020, pp. 1-39.
Bellicoso et al., "Perception-less Terrain Adaptation through Whole Body Control and Hierarchical Optimization," 2016 IEEE-RAS 16th International Conference on Humanoid Robots (Humanoids) Cancun, Mexico, Nov. 15-17, 2016, pp. 558-564.
"Robots and robotic devices—Collaborative robots," © The British Standards Institution 2016. BSI Standards Publication, PD ISO/TS 15066:2016, 9 pp.
Seo et al., "Stable Bilateral Teleoperation using the Energy-Bounding Algorithm: Basic Idea and Feasibility Tests*," Proceedings of the 2008 IEEE/ASME International Conference on Advanced Intelligent Mechatronics, Jul. 2-5, 2008, Xi'an, China, pp. 335-340.
Ryu et al., "Stable Teleoperation With Time-Domain Passivity Control," IEEE Transactions on Robotics and Automation, vol. 20, No. 2, Apr. 2004, pp. 365-373.
Hannaford and Ryu, "Time Domain Passivity Control of Haptic Interfaces," Revised and re-submitted to IEEE Transactions on Robotics and Automation, May 16, 2000, pp. 1-39.

\* cited by examiner (a) Energy flow into the network systems when $f \cdot v > 0$ (b) Energy flow out of the network systems when $f \cdot v < 0$

PASSIVITY FRAMEWORK FOR IMPROVING STABILITY IN ROBOT-HUMAN INTERACTIONS

RELATED DISCLOSURES

This patent disclosure is related to U.S. Provisional Application No. 63/593,861 filed Oct. 27, 2023, entitled "A PASSIVE ROBOT-MEDIATED PHYSICAL HUMAN-HUMAN INTERACTION WITH HIERARCHICAL CONSTRAINTS", in the names of the same inventors which is incorporated herein by reference in its entirety. The present patent application claims the benefit under 35 U.S.C § 119(e) of the aforementioned provisional application.

BACKGROUND

The present disclosure generally relates to human-robot-human interactions. More particularly, the disclosed subject matter relates to methods and systems incorporating a passivity approach that ensures stable robotic behaviors during bilateral physical interaction between two humans while enforcing constraints with different priorities on each side in the presence of time-varying destabilizing factors such as control system limitations, human variability, hard contacts, relaxed user grasps, stiff control settings, and/or communication delays.

Physical interaction between humans happens in many settings like daily activities, health care, industry and rehabilitation. Instances of such interactions include assisting an individual who has fallen, a medical practitioner conducting a patient examination, a physical therapist administering stretching therapy, or a sports coach instructing a new exercise or movement. Using robots to mediate physical human-human interaction, i.e., physical human-robot-human interactions (pHRHIs), may benefit this interaction in many aspects. For example, robots may enable greater customization of the physical interaction between the individuals and facilitate remote applications of such interactions. However, in the context of pHRHI, several factors greatly affect stability and may lead to negative consequences. Such factors include but are not limited to (a) control system limitation, (b) lack of compliance, (c) delay and latency in sensors, control commands, data processing, and communication channels, (d) human variability, (e) hard contact in the remote environment, and (f) stiff position and force control settings.

There is a need in the art for a robotic interaction system that facilitates stability in human interactions.

SUMMARY

The disclosed embodiments provide methods and systems for improving stability in bilateral human-robot interaction system.

In one aspect, a method for stabilizing a bilateral human-robot interaction system that includes an operator port and a partner port is provided. The method may include deriving a set of constraints by separating input energy and output energy at each port of the human-robot interaction system, wherein each of the constraints defines a task with a pre-assigned priority level. The method may include calculating, by each robot of the human-robot interaction system, a hierarchical optimization motor solution that solves each of the tasks starting from the highest-priority task and progressing sequentially through lower-priority tasks. The method further includes implementing, via a motor of a first robot of the human-robot interaction system, the hierarchical optimization motor solution to actively modulate energy flow in the human-robot interaction system such that the output energy at the partner port is less than the input energy at the operator port, and the output energy at the operator port is less than the input energy at the partner port during use of the human-robot interaction system.

Another aspect provides a system for stabilizing a bilateral human-robot interaction mechanism that includes an operator port and a partner port. The system may include a processor and machine-readable media including instructions which, when executed by the processor, causes the processor to: (1) derive a set of constraints by separating input energy and output energy at each port of the human-robot interaction system, wherein each of the constraints defines a task with a pre-assigned priority level; (2) calculate, by each robot of the human-robot interaction system, a hierarchical optimization motor solution that solves each of the tasks starting from the highest-priority task and progressing sequentially through lower-priority tasks; and (3) implement, via a motor of a first robot of the human-robot interaction system, the hierarchical optimization motor solution to actively modulate energy flow in the human-robot interaction system such that the output energy at the partner port is less than the input energy at the operator port, and the output energy at the operator port is less than the input energy at the partner port during use of the human-robot interaction system.

Another aspect provides a human-robot interaction system that includes a passivity framework. The system may include (a) a bilateral controller communication network to facilitate the transfer of energy between a first port and a second port; (b) the first port, including a first robot that is controlled by a human operator, the first robot employing a first hierarchical optimization module that modulates a flow of energy between the first robot and the bilateral controller communication network such that energy supplied by the human operator via the first robot into the first port is always greater than or equal to energy that is output to the second port; and (c) the second port, including a second robot that is controlled by a human partner, the second robot employing a second hierarchical optimization module that modulates a flow of energy between the second robot and the bilateral controller communication network such that energy supplied by the human follwer via the second robot into the second port is always greater than or equal to energy that is output to the first port.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments may be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Human-human (HH) interactions in motor control and rehabilitation contexts typically occur through direct physical connection. For example, in physical therapy, the therapist interacts with patients by holding their limb to guide or assist them. In some cases, however, it is beneficial to controllably customize the physical interface between the therapist and the patient. One way to achieve this customized interface is to connect each human to a robot. The robots may then be controlled to implement desired interaction dynamics between the humans, and possibly to display a virtual or remote external environment. The simplest scenario involves two humans interacting through two robots, but other interaction network topologies, with more humans involved (e.g., for group training), are possible. For purposes of this application, such systems of robot-mediated interacting humans may be referred to herein as "human-robot-robot-human" (HRRH) interactions, "physical human-robot interaction" (pHRI), "physical human-robot-human interaction" (pHRHI), or "human-robot-human" (HRH) for short. In addition to physical interaction, HRH systems support non-physical interaction (e.g., audiovisual interaction), which may lead to improved motivation and task performance. For example, an arm exoskeleton may measure the joint angles of the human arm and estimate the hand's position. The individuals' state information may then be projected to a virtual environment where both users see visual cues about themselves and their partners. While these kinds of virtual environments directly provide visual interaction between individuals, they may also indirectly improve auditory interaction by providing more content to an operator (leader) to talk about with their partner (follower) or vice-versa.

In conventional settings, physical human-human interactions (pHHI) may offer a wide range of services and benefits. For example, a first human may be helped by a second human to stand up after falling, a human medical doctor may physically and directly examine a human patient and/or provide medical services, human support staff may assist the elderly with stairs or other challenging mobility areas, a human physical therapist may perform stretch therapy with their human patient, a human sports coach may teach new movements to a human student, a human friend may assist another human friend as they lift and carry heavy furniture, etc. In each of these interactions, two or more humans are in/share the same real-world environment and able to contact one another physically. However, with the advent of robot-mediated physical human-human interactions, these same types of scenarios may be enabled even when the human participants are no longer in the same environment.

Figure 1:
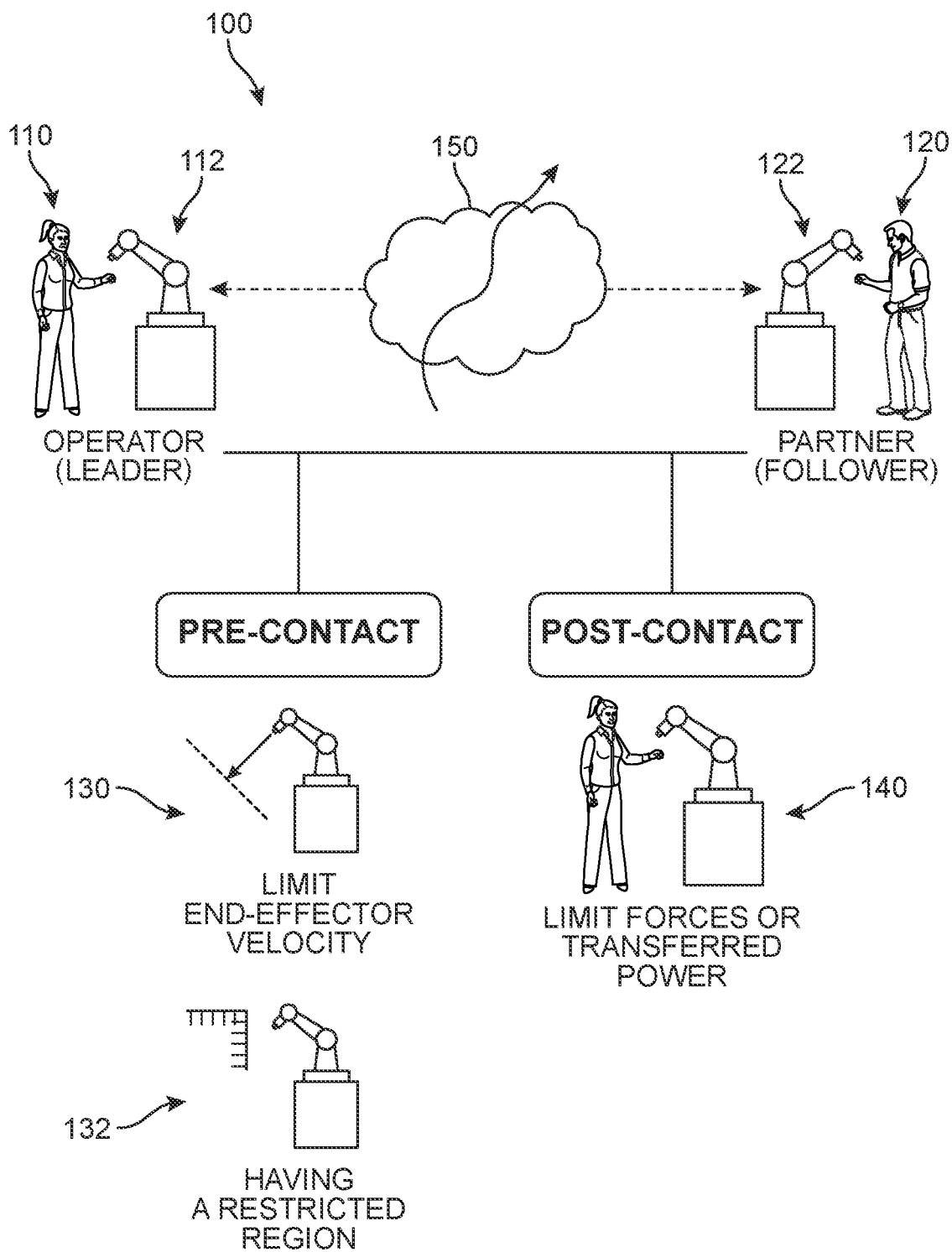
FIG. 1 depicts a schematic view of a bilateral human-robot teleoperation system, according to an embodiment.

A schematic diagram illustrating on example of a robot-mediated physical human-human interaction 100 is depicted in FIG. 1. There is generally a first person (operator/leader) 110 who is working, via a first robotic device 112 such as an interface or controller, to perform some task that will be communicated as a set of instructions over a network 150 to a second robotic device 122. In some embodiments, the robotic device may be a wearable such as a leg brace that causes the wearer's leg to move in a specific motion pattern. The instructions may be translated and implemented as a physical movement by the second robotic device 122. This physical movment represents the performance of the task selected by the first person 110 that is to benefit, support, or facilitate some physical action in cooperation with a second person (partner/follower) 120. In different embodiments, the first person 110 may be a physical therapist or other facilitator, while the second person 120 may be a patient or other person who is the primary beneficiary of the interaction.

There is a risk of instructions provided by the operator being mistranslated or corrupted. As a general approach, ISO standards 13482 and technical specification 15066 describe some boundaries to these interactions. There exists, for example, guidance that describes boundaries between the human participant (either the first person 110 or second person 120) as they interact with their respective robotic device that may limit the end-effector velocity 130 of the robot, bars entry of the robot to a restricted region 132, or limits the forces and transferred power 140 between the human and the robot to reduce discomfort. However, a significant source of irregular interactions that has not yet been successfully addressed with respect to these types of interactions fall outside these limits and restrictions, and are most frequently the result of unstable behaviors and the absence of passive interaction. For example, several factors have continued to significantly affect system stability and may lead to negative consequences for end-users, particularly when the system must incorporate multiple limitations (constraints) with different priorities. Some examples of these factors include but are not limited to: (a) control system limitation, (b) lack of compliance, (c) delay and latency in sensors, control commands, data processing, and communication channels, (d) human variability, (e) hard contact in the remote environment, and (f) stiff position and force control settings. In cases of bilateral teleoperations, the physical interface and experience provided by the system through which the interaction will be conveyed may further be negatively affected by stiff position and force control settings, hard contacts in the remote environment, time delays in the communication channels between the operator and the partner, and even the grasp strength (e.g., too weak/relaxed) of the user.

As will be described in greater detail below, the proposed embodiments provide a passivity framework for pHRI systems by which such stability and comfort may be ensured. In different embodiments, the passivity framework is used to derive a set of sufficient conditions which satisfies the passivity of the one port (in cases of human-robot-human interactions) or two-port (in cases of human-robot-robot-human interactions) network system, by separating the input and output energy at each port. A sufficient condition refers to a condition or set of conditions that will produce a target event. In some embodiments, a hierarchical optimization approach is then provided to satisfy these conditions, as well as other constraints for bilateral controls. In one example, a back-up passivity control may be included in the bilateral controls to maintain optimization in cases where the energy of the system has been depleted. The proposed passivity framework, tested in bilateral teleoperation interactions, has shown to significantly improve stabilization of the system even in highly unstable scenarios resulting from the control system limitations. In contrast to other methods that require precise knowledge of the system dynamics, lead to extra damping in the system that degrades system performance and transparency, are limited to specific control frameworks, or reduce achievable transparency and restrict the implementable bilateral controller to the specific implementation, the proposed embodiments may be readily implemented into existing pHRI systems without such issues. Furthermore, the disclosed passivity framework may accommodate constraints with different priorities, while allowing partner's constraints to be fed to the operator. More specifically, in different embodiments, the proposed framework may guarantee passivity through the pHRI system by taking into account the energy flow into and out of the system. This process is enabled through solving the hierarchical optimization of the system, including the numerous and varying constraints each associated with different priority in the bilateral interaction.

Figure 2:
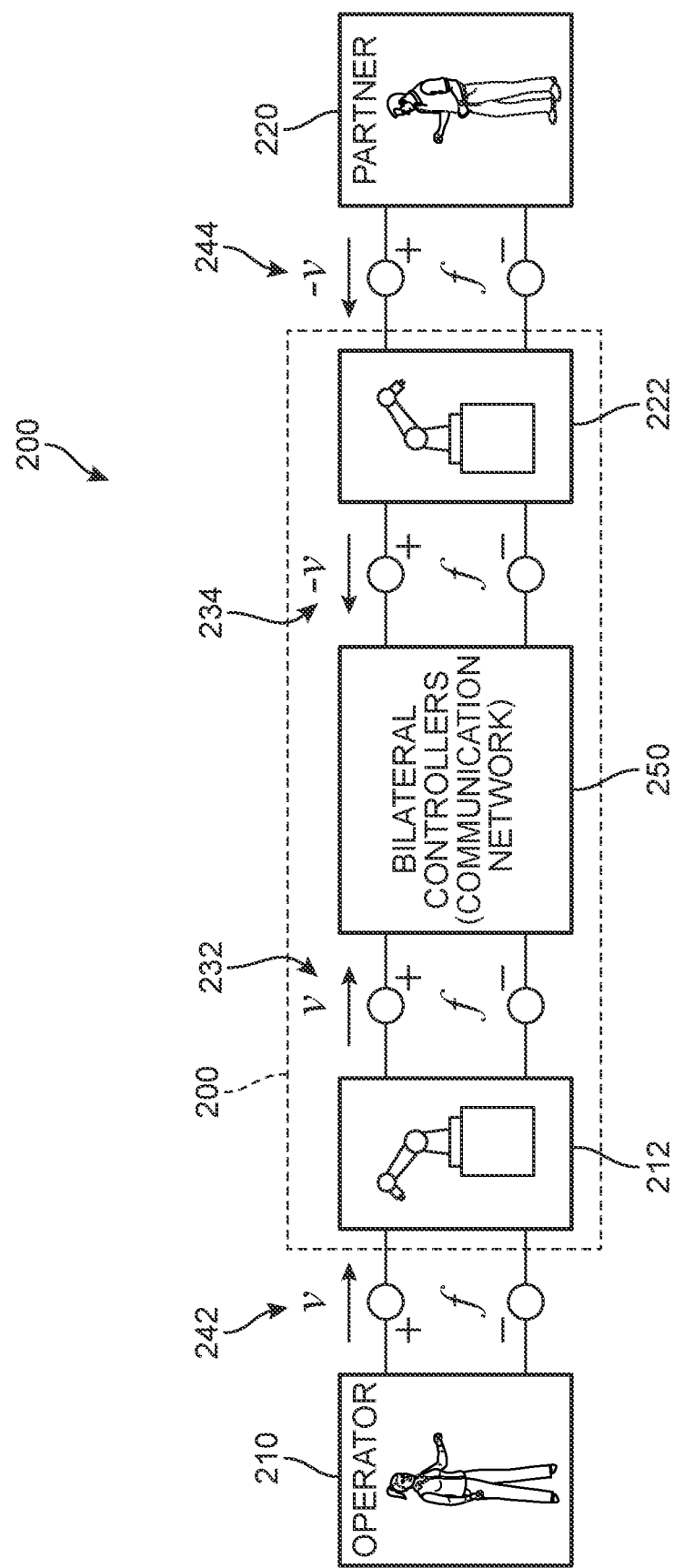
FIG. 2 depicts a block diagram of a bilateral teleoperation system in which a passivity framework is implemented, according to an embodiment.

Referring now to FIG. 2, a schematic diagram depicting an embodiment of a first embodiment of a bilateral teleoperations environment 200 is presented in which passivity of the energy flow in and out of the system is enabled based on a hierarchical optimization solution of the constraints that are imposed at different priority levels. In FIG. 2, a first party 210 is engaged with a first bilateral teleoperations system ("first bilateral system") 230 which allows them to interact remotely with a second party 220. Similarly, the second party 220 is also engaged through the same first bilateral teleoperations system 230 to interact remotely with the first party 210. In this arrangement, the first party 210 may transmit and receive first velocity and force information ("first information") 242 through first robot 212. When sending first information 242, the first robot 212 may translate the operator's motions or other instructions into first robotic instructions 232. A communication network 250 receives the first robotic instructions 232 and transmits them along to second robot 222, which responds and/or moves in response and the second party 220 is the recipient of the second robot's reaction.

In different embodiments, the communication network 250 may be one of a wired connection or a wireless connection. Examples of the communication network 250 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 250 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols Furthermore, in this bilateral system 250, the second party 220 may interact with varying levels of force and velocity to respond to the operator and transmit their own second velocity and force information ("second information") 244 through their on-site second robot 222. When passing along second information 244, the second robot 222 may translate the partner's motions or other instructions into second robotic instructions 234. The communication network 250 receives the second robotic instructions 234 and transmits them to first robot 212, which responds and/or moves in response and the first party 210 is the recipient of the first robot's reaction. In other examples, the first robot 212 may instead represent the second robot's motion in a different medium, for example, via a graphical tracker on a display of a computing device. Thus, in some embodiments, while one of the robotic devices may include wearable biomedical equipment, the other robotic device may include a controller interface and monitor.

More specifically, FIG. 2 represents a leader-follower scheme used to create bilateral physical interactions between two humans. In this case, v denotes the velocities at the interacting points of the operator or partner and f represents the force that the operator applies to the robot and the partner applies to the robot\environment. In a teleoperation system with a bilateral control mechanism as illustrated here, the human operator provides energy to the system using a robot. This energy is then sent to the partner's robot through the control system. If, during the interaction, there is any energy that "bounces back", this energy is sent back to the operator through the control system.

Thus, the operator's desired six-dimensional task space end-effector pose (conveyed as first information 242) is transmitted to the partner's robot, while the partner's sensed six-dimensional wrench (second information 244) is sent to the operator's robot as the desired interaction force and torque. This setup enables the operator to guide the partner while sensing the forces and torques applied by the partner. As a general matter, the equation of motion of the operator's (i=O) and partner's (i=P) robot may be written as:

$$M_i(q)q_i'' + b_i(q, \dot{q}) + g_i(q) = \tau_i^{motor} - \tau_i^{fric} - J_i^T TF_{int,i} \; i \in \{O, P\} \quad \text{Equation (1)}$$

where q is the vector of joint positions, M is the mass matrix, b is the Coriolis vector, g is the gravity vector. The variable $\tau^{motor}$ is the motor torque, and $\tau^{fric}$ is the vector of frictional torques at the joints. The friction model and estimated parameters may be implemented based on values taken from the study by C. Gaz, M. Cognetti, A. Oliva, P. R. Giordano, and A. De Luca, "Dynamic identification of the franka emika panda robot with retrieval of feasible parameters using penalty-based optimization," IEEE Robotics and Automation Letters, vol. 4, no. 4, pp. 4147-4154, 2019, which is hereby incorporated by reference in its entirety. $F^{int}$ is the interaction wrench between the human and the robot. To calculate $F^{int}$, the force and resulting moment due to the weights of the gripper and robot hand are subtracted from the sensor measurements. J is the Jacobian of the end effector represented in the respective world coordinate frame.

However, as noted earlier, to ensure the bilateral physical interaction is stable and does not exceed system capabilities, it is essential to verify that the transmitted commands are physically feasible, maintain system stability, and do not move outside the established constraints. Additionally, precautions must be taken to prevent the robot from entering restricted areas and to ensure that forces applied to the humans stay within specified thresholds. Stability and passive operation therefore are crucial considerations. It may be appreciated that, depending on the specific application of the system at a given time/scenario, different constraints may have varying levels of importance.

This arrangement (a) accommodates physical and mechanical constraints with different priorities, (b) feeds the constraint on the partner side to the operator side (and vice-versa), and (c) guarantees comfortable and passive interaction without compromising performance. Furthermore, the introduction of the passivity modules for each robotic device enables conservative passivity control that may provide both performance and stability while guarantee stability and passivity with minimal modifications of the original structure. In addition, the parties do not need to have any knowledge of the kinematic/dynamic information of the robots to engage with this system, the features are implemented regardless of any time delays in the network, and the arrangement is application agnostic. Finally, as will be discussed further below, the proposed systems incorporate passivity without sacrificing performance.

As a general matter, the passivity components are used to ensure that energy supplied by the network may never exceed the energy that has been fed into it. More specifically, a particular bilateral system may be assigned a task or constraint, which may be denoted as "task p" with priority p. This may be expressed as either an equality or inequality constraint, represented as:

$$T_p : \begin{cases} A_p x = b_p \\ D_p x \leq f_p \end{cases} \quad \text{Equation (2)}$$

$$x : \begin{bmatrix} \ddot{q} \\ \tau_{motor} \end{bmatrix}$$

where $A_p \in R^{m_p \times n}$, $b_p \in R^{m_p}$, $D_p \in R^{c_p \times n}$, and $f_p \in R^{c_p}$. The scalars n, $m_p$, and $c_p$ are the sizes of the optimization vector x, equality constraint, and inequality constraint, respectively. The optimization vector $x \in R^n$ is chosen to be the combined vector of joint accelerations and motor torques, $[\ddot{q}^T, T^T]^T$. Tasks are solved in a prioritized sequence from the highest priority (p=1) to the lowest priority (p=np), ensuring that the solution of higher-priority tasks remains unaffected (i.e., tasks are solved from the highest priority (p=1) to the lowest priority without compromising the optimized solution of the higher priority tasks). This approach may be formulated for task p as:

$$\begin{bmatrix} x_p^* \\ v_p^* \end{bmatrix} = \operatorname{argmin}(\|A_p x - b_p\| + \|v_p\|) \quad \text{Equation (3)}$$

s.t. $D_p x - f_p \leq v_p$
$v_p \geq 0^{c_p}$
$D_1 x - f_1 \leq v_1^*$
$\vdots$
$D_{p-1} x - f_{p-1} \leq v_{p-1}^*$
$A_1 x - b_1 = A_1 x_1^* - b_1$
$\vdots$
$A_{p-1} x - b_{p-1} = A_{p-1} x_{p-1}^* - b_{p-1}$ where $V_p \in R^{m_p}$ serves as the slack variable associated with the inequality constraints, and $[x^*, v+]^T$ represents the optimized solution for task p. This mathematical representation may then be transformed into a standard quadratic programming form, similar to the approach outlined in C. D. Bellicoso, C. Gehring, J. Hwangbo, P. Fankhauser, and M. Hutter, "Perception-less terrain adaptation through whole body control and hierarchical optimization" in 2016 IEEE-RAS 16th International Conference on Humanoid Robots (Humanoids) IEEE, 2016, pp. 558-564, which is herein incorporated by reference in its entirety, as:

$$\xi^* = \begin{bmatrix} x_p^* \\ v_p^* \end{bmatrix} = \operatorname*{argmin}_{\xi^* = [x^T, v_p^T]^T} \left( \frac{1}{2} \xi^T H_p \xi + c_p^T \xi \right) \quad \text{Equation (4)}$$

s.t. $l_p \leq K_p \xi \leq u_p$ where $$H_p = \begin{bmatrix} A_p^T A_p & 0^{n \times c_p} \\ 0^{c_p \times n} & I_{c_p \times c_p} \end{bmatrix}, \quad \text{Equation (5)}$$

$$c_p = \begin{bmatrix} -A_p^T b_p \\ 0^{c_p} \end{bmatrix},$$

$$K_p = \begin{bmatrix} D_p - I_{c_p \times c_p} & & \\ 0^{c_p \times n} & & I_{c_1 \times c_p} \\ \vdots & & \\ D_{p-1} - 0^{c_{p-1} \times c_p} & & \\ A_1 - 0^{m_1 \times c_p} & & \\ & & \vdots \\ 0^{m_{p-1} \times c_p} & & \end{bmatrix},$$

$$l_p = \begin{bmatrix} -\infty^{c_p} \\ 0^{c_p} \\ -\infty^{c_1} \\ \vdots \\ -\infty^{c_{p-1}} \\ A_1 x_1^* \\ \vdots \\ A_{p-1} x_{p-1}^* \end{bmatrix},$$

$$u_p = \begin{bmatrix} f_p \\ \infty^{c_p} \\ v_1^* + f_1 \\ \vdots \\ v_{p-1}^* + f_{p-1} \\ A_1 x_1^* \\ \vdots \\ A_{p-1} x_{p-1}^* \end{bmatrix}$$

In different embodiments, this approach is implemented using the OSQP library (e.g., see B. Stellato, G. Banjac, P. Goulart, A. Bemporad, and S. Boyd, "Osqp: An operator splitting solver for quadratic programs," Mathematical Programming Computation, vol. 12, no. 4, pp. 637-672, 2020, which is herein incorporated by reference in its entirety) to address the quadratic problem outlined in Equation 4 above. Thus, tasks are solved starting from the highest priority task and progressing through lower-priority tasks sequentially. The resulting torque solution, obtained after solving the lowest-priority task, is then applied to the motors.

The proposed systems have been tested to cover and accommodate a wide range of task and system constraints, boundary limits, bilateral leader-follower communications, and redundancy resolution factors, including but not limited to (a) Equation of Motion, (b) Robot Joint Limits, (c) Task Space Constraints, (d) End-effector Acceleration Tracking, and (e) Joint Acceleration Minimization. With these factors in mind, the proposed passivity framework may help guarantee stability and passivity on both ends of the system. Additional details regarding the passivity framework are provided below.

Because the primary source of output energy at one interface is the input energy at the other interface, to maintain passivity, the proposed systems are directed to ensuring that the output energy remains lower than the input energy. This condition may be established based on the following sufficient condition, as outlined below:

$$E_{in}^O(k) \geq E_{out}^P(k),$$
$$E_{in}^P(k) \geq E_{out}^O(k),$$
Equation (6)

Figure 4A:
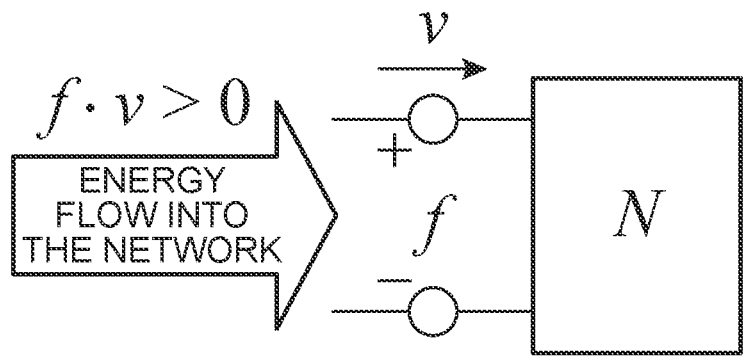
FIGS. 4A and 4B are schematic representations of energy flow through the system when a passivity framework is employed, according to an embodiment.
Figure 4A:
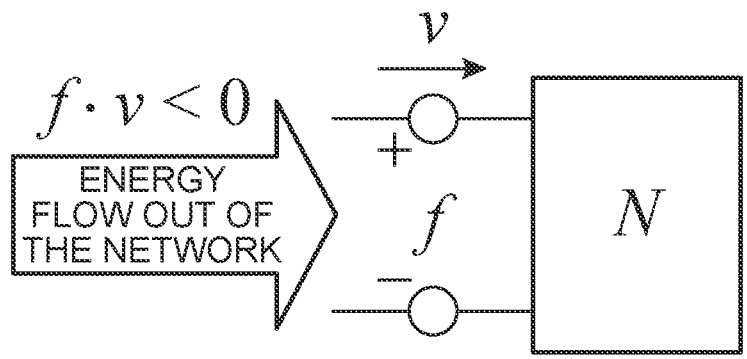
Figure 4B:
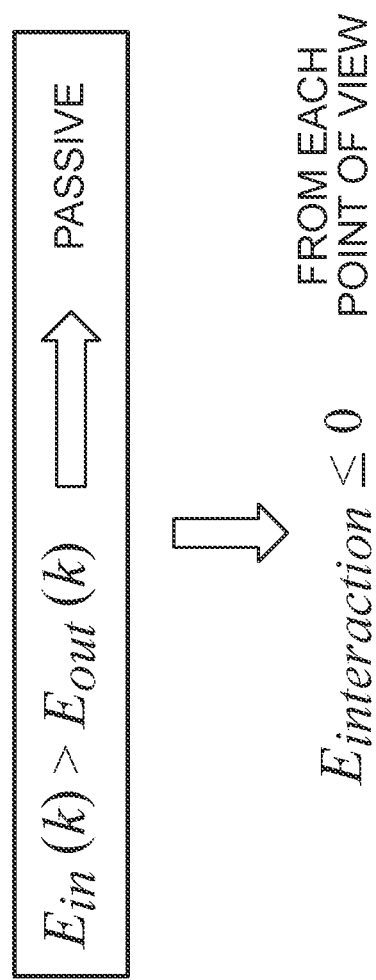

In other words, the output energy at the partner port should be less than the input energy at the operator port, and the output energy at the operator port should be less than the input energy at the partner port. A schematic illustration of this approach to passivity constraints is presented in FIGS. 4A and 4B. This sufficient condition is valid even for the case when there is time-varying communication delay.

Furthermore, with the assumption that $D^{OP}$ and $D^{PO}$ (P=partner, O=operator) correspond to the amount of communication delays from operator to partner and partner to operator, respectively, the two conditions of Equation (6) may be modified as follows:

$$E_{in}^O(k - D^{OP}) \geq E_{out}^P(k),$$
$$E_{in}^P(k - D^{PO}) \geq E_{out}^O(k),$$
Equation (7)

These conditions may then be re-expressed based on Equation (2) for incorporation into the hierarchical passivity framework. To reformulate these constraints, the estimated interaction wrench force was obtained as:

$$\hat{F} = (J^T)^\dagger (\tau_{motor} - b - g - \tau_{fric})$$

By replacing this in Equation (7), the following equation is obtained:

$$V_O^T((J^T)^\dagger (\tau_{motor} - b - g) \geq V_O^T F_O$$

This constraint may then be formulated based on Equation (2) for the operator as:

$$D_E = \left[0_{1 \times n_{j'}} - V_O^T (J^T)^\dagger\right],$$
$$f_E = -V_O^T((J^T)^\dagger (b + g)) + F_O)$$
Equation (8)

It may be appreciated that this constraint may be easily modified for the pHRI, when there is no bilateral teleoperation, by using the following form:

$$E_{interaction} \leq E_0$$
Equation (9)

which may then be provided in the form of Equation (2) as:

$$D_E = \left[0_{1 \times n_{j'}} - V_O^T (J^T)^\dagger\right],$$
$$f_E = V_O^T((J^T)^\dagger (b + g)) + E_0$$
Equation (10)

Furthermore, as the partner side follows the operator position, this formulation may be based on the operator's pose/position. The end-effector acceleration may therefore be expressed as:

$$\begin{bmatrix} \ddot{r} \\ \ddot{\phi} \end{bmatrix} = J\ddot{q} + \dot{J}\dot{q}$$
Equation (11)

and $$\begin{bmatrix} \ddot{r} \\ \ddot{\phi} \end{bmatrix} = \left(\frac{V(k) - V(k-1)}{\Delta t}\right)$$

then $$V(k) = (J\ddot{q} + \dot{J}\dot{q})\Delta t + V(k-1)$$

Based on this acceleration, the system constraint may be expressed as:

$$F_{measP}^T((J\ddot{q} + \dot{J}\dot{q})\Delta t + V_{com_O}(k-1)) \geq F_{measP}^T V_{measP}$$

and the constraint of Equation (7) is re-expressed based on Equation (2) for the partner by $$D_E = \left[F_P^T J, 0_{1 \times n_j}\right],$$
$$f_E = F_P^T(\dot{J}\dot{q} + V_O(k-1)/\Delta t - V_P/\Delta t)$$
Equation (12)

In different embodiments, the constraints described above may be added into the hierarchical optimization at the same level of priority, with bilateral control, to guarantee passive interaction and transparency. This framework is configured to operate based on evaluation of all constraints—and their respective priority levels—and the torque solution obtained after solving the optimization applied to the motor. However, if the optimization fails to find a solution that may guarantee passivity and provide bilateral tracking at the same time, especially in the scenarios involving highly unstable conditions, which may lead to unexpected behavior and poor system responses, an alternate embodiment is also provided.

Figure 3A:
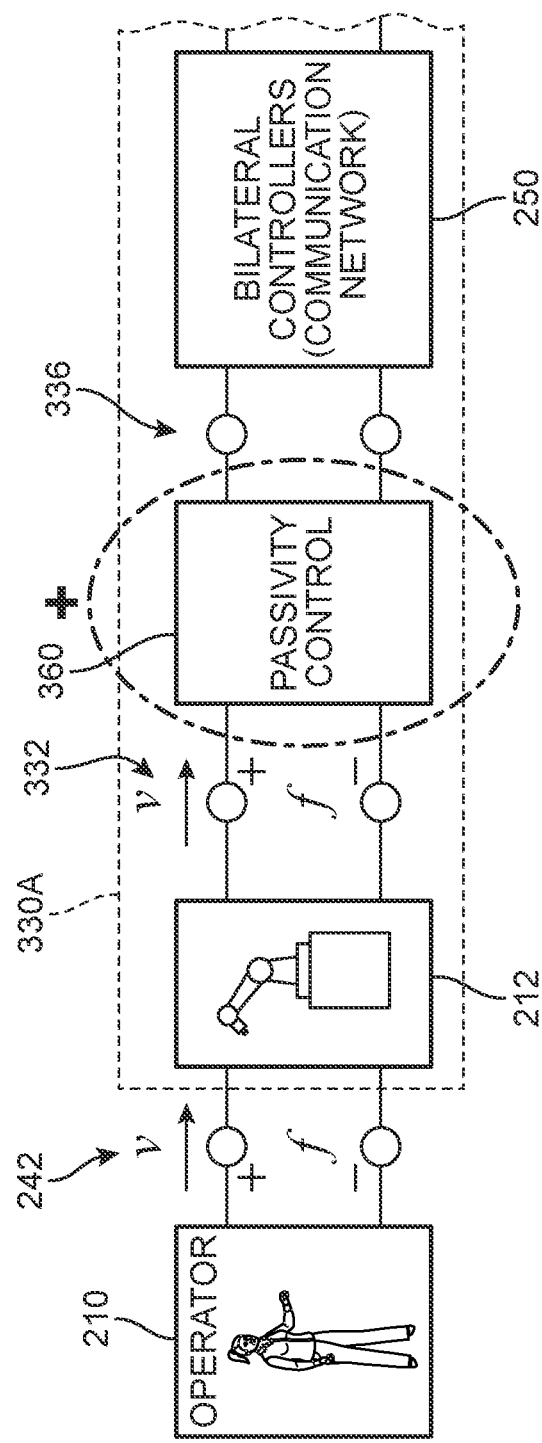
FIGS. 3A and 3B show a block diagram of a bilateral teleoperation system in which a passivity framework with back-up passivity controls is implemented, according to an embodiment.
Figure 3B:
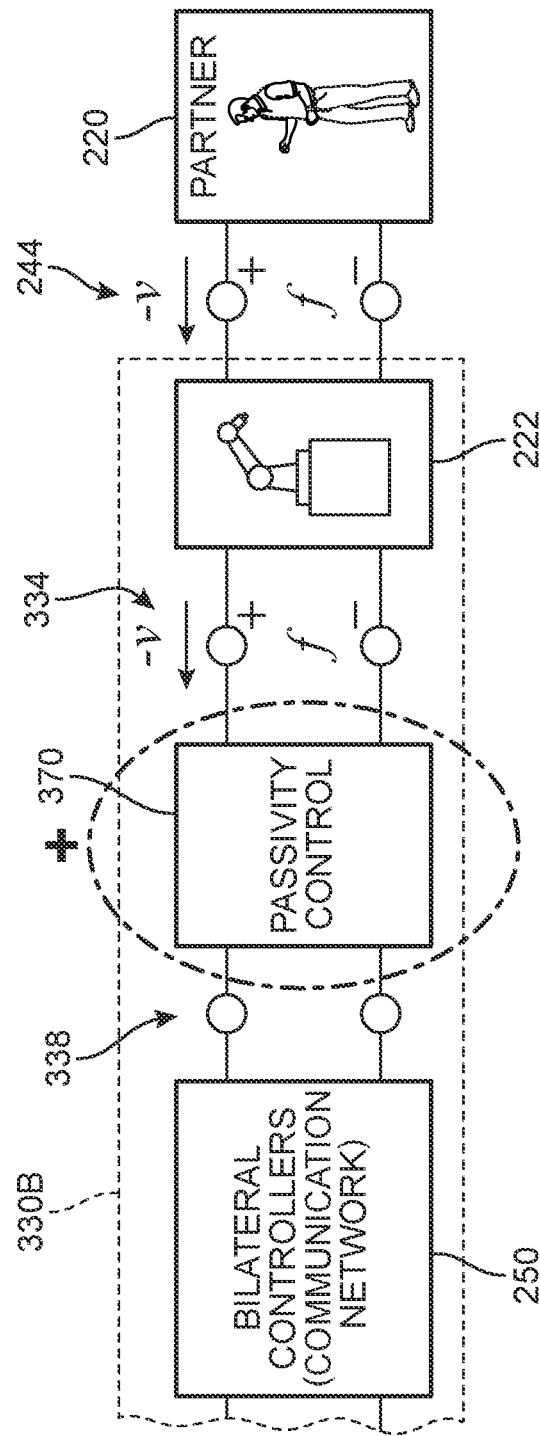

For example, in different embodiments, the proposed framework modifies the depicted first bilateral system 230 to allow for back-up passivity controls to add to the depleted energy of the system and prevent any risk of failure of the optimization solution described above. Moving to FIGS. 3A and 3B, one example of a second bilateral teleoperations system ("second bilateral system") 330a, 330b is shown (collectively referred to as second bilateral system 330). In both the first bilateral system 230 (see FIG. 2) and the second bilateral system 330, in order to address the comfort and stability deficits described above, each robot employs a hierachical optimization control scheme to manage those aspects. Thus, for purposes of this application the second bilateral system 330 may also be referred to as a hierarchical framework for different constraints (HFDC). As shown in FIG. 3A, a first passivity control module 360 has been incorporated or added, bridging and modulating the communications between the first robot 212 and communication network 250. Similarly, as shown in FIG. 3B, a second passivity control module 370 has been incorporated or added, bridging and modulating the communications between the second robot 222 and communication network 250.

Each of these passivity controls (e.g., first passivity control module 360 and second passivity control module 370) may apply a small opposing force ($F_{diff}$) to the associated user's movement by modulating a virtual damper to extract energy from the user into the system in case the unstable condition depletes all the energy in the system. Furthermore, in some embodiments, because bilateral control for the partner side and the operator side will be different and the proposed passivity controller modules are being added to the bilateral system, the formulation of the controllers will be different at each side.

Thus, as represented below, back-up passivity control on the operator side is expressed by:

$$F_{PC} = F_{int}^P + \beta_O V$$

where $F_{diff}=\beta_O V$ is a small opposing force applied to the user's movement to extract energy from the user and pass this energy into the system, and $\beta_O$ is the damping element:

$$\beta_o = \begin{cases} \frac{E_{out}^O - E_{in}^P(k - D^{PO})}{\Delta t V^2} & \text{if } E_{out}^O > E_{in}^P(k - D^{PO}) \text{ \& } V \neq 0 \\ 0 & \text{if } E_{out}^O \leq E_{in}^P(k - D^{PO}) \end{cases}$$

In different embodiments, this "back-up" passivity controller may be easily modified for the pHRI, when there is no bilateral teleoperation, and the passivity constraint is in the form of the equation below. For this approach, the $\beta_O$ may be modified into the following form:

$$\beta_o = \begin{cases} \gamma(E_{interaction} - E_0) & \text{if } E_{interaction} > E_0 \\ 0 & \text{if } E_{interaction} \leq E_0 \end{cases}$$

where $\beta$ is a parameter that may be used to tune the rate at which energy is extracted from the user. A closed-loop admittance controller at the end-effector's acceleration level may also be implemented to render the six-dimensional force and torques, as below:

$$\begin{bmatrix} \ddot{r}_0^{adm} \\ \ddot{\phi}_0^{adm} \end{bmatrix} = \frac{F_{PC} - F_{int}^o}{\Lambda_{virt}}$$

where $\Lambda_{virt} \in R^{6\times 6}$ is the defined virtual task space mass matrix and is set as a scaled down version of the actual task-space mass matrix:

$$\Lambda = (JM^{-1}J^T)^{-1}$$

$$\Lambda_{virt} = \alpha \Lambda$$

where $\alpha$ is a scaling factor. In this case, a smaller $\alpha$ leads to better force rendering. Defining $\alpha$ as a scalar makes tuning significantly easier. Such an approach is similar to that of a force filter with a virtual mass—because it is passive, it does not affect the passivity.

In different embodiments, if the partner's robot cannot track (mirror or otherwise represent) the desired end-effector acceleration due to constraints, this will result in a difference between the desired and optimized accelerations. The optimized end-effector acceleration $\ddot{r}^*$ may then be calculated using Equation (11) and optimized joint accelerations. The difference between the optimized and desired end-effector accelerations due to the constraints is as below:

$$\begin{bmatrix} \ddot{r}_{const}^P \\ \ddot{\phi}_{const}^P \end{bmatrix} = \begin{bmatrix} \ddot{r}_P^* \\ \ddot{\phi}_P^* \end{bmatrix} - \begin{bmatrix} \ddot{r}_{des}^P \\ \ddot{\phi}_{des}^P \end{bmatrix}$$

In addition, the acceleration commands from the admittance controller and the acceleration error on the partner side due to constraints are summed to form the desired end-effector acceleration of the operator:

$$\begin{bmatrix} \ddot{r}_{des}^O \\ \ddot{\phi}_{des}^O \end{bmatrix} = \begin{bmatrix} \ddot{r}_{adm}^O \\ \ddot{\phi}_{adm}^O \end{bmatrix} + w \begin{bmatrix} \ddot{r}_{const}^P \\ \ddot{\phi}_{const}^P \end{bmatrix}$$

where w is the adjustable weight for modifying the feeling of the partner's constraints.

In some embodiments, the desired end-effector accelerations may also be formulated as equality constraints for the operator as follows:

$$A_{\ddot{q}} = [J, 0_{6\times nj}], b_{\ddot{q}} = \left[\ddot{r}_{des}^T, \ddot{\phi}_{des}^T\right]^T - \dot{J}\dot{q} \qquad \text{Equation (13)}$$

Through this formulation, the operator feels not only the partner force, but also the partner's constraints, so that passivity is guaranteed.

As noted above, because bilateral control for the partner side and the operator side will be different and this controller is added to the bilateral system, the formulation of each controller is different on each side. since there is a operator's pose tracking in this side, back-up passivity control on the partner side may be expressed as:

$$V_{PC} = V_O + \beta_P F_{int}^P \qquad \text{Equation (14)}$$

where $\beta_P$ is the damping element added to the desired velocity to guarantee passivity:

$$\beta_P = \begin{cases} \frac{E_{out}^P - E_{in}^O(k - D^{OP})}{\Delta t F_P^2} & \text{if } E_{out}^P > E_{in}^O(k - D^{OP}) \text{ \& } F_P \neq 0 \\ 0 & \text{if } E_{out}^P \leq E_{in}^O(k - D^{OP}) \end{cases}$$

In other words, the desired velocity of the partner is modified to satisfy passivity requirements. In one embodiment, the desired end-effector acceleration may then be calculated based on the difference between the operator's command (after applying passivity control) and the partner's end-effector poses. Because Equation (14) is based on the operator's velocity, a conversion may be performed to convert it to express the operator's poses. With respect to the linear motion, the following equation may be provided: then $$\frac{W_r^{W_o}(k) - W_r^{W_o}(k-1)}{\Delta t} + \beta_P F_P^{lin} = \frac{W_r^{W_o^{PC}}(k) - W_r^{W_o^{PC}}(k-1)}{\Delta t}$$

$$W_r^{W_o^{PC}} = W_r^{W_o} + \beta_P F_P^{lin}$$

With respect to the angular motion, the following equation is used:
then $$V_o^{PC_{ang}} = V_o^{ang} + \beta_P F_P^{ang}$$

$$\Delta R_{W_o}^{PC} = \exp\left\{\left[V_o^{PC_{ang}}\right]_x \Delta t\right\}$$

where $[V]_x$ is the skew-symmetric matrix of angular velocity of V. In this context, the orientation is expressed as:

$$R_{W_o}^{PC} = R_{W_o} \Delta R_{W_o}^{PC}$$

and position and orientation errors are expressed as:

$$r_{err} = W_r^{W_o^{PO}} - W_r^{W_P}$$

$$\phi_{err} = \log\left(R_{W_P}^T R_{W_o}^{PC}\right)$$

and $$W_r^{W_P}$$

$R_{W_P}$ are the end-effector position and orientation of partner expressed in the respective world frame. Furthermore, where $\phi_{err}$ is the skew-symmetric representation of the orientation error, the desired linear and rotational end-effector accelerations are:

$$\ddot{r}_{des}^P = K_{lin} r_{err} + D_{lin} \dot{r}_{err}$$

$$\ddot{\phi}_{des}^P = K_{rot} \phi_{err} + D_{rot} \dot{\phi}_{err}$$

where K and D are tuned impedance parameters for pose tracking.

Finally, the desired end-effector accelerations may be formulated as equality constraints for the partner as:

$$A_{\ddot{q}} = [J, 0_{6 \times nj}], b_{\ddot{q}} = \left[\ddot{r}_{des}^T, \ddot{\phi}_{des}^T\right]^T = \dot{J} \dot{q} \quad \text{Equation (15)}$$

In order to better evaluate the effectiveness of the variable stiffness controller a set of tests were performed that incorporated the proposed systems. For the tests, a 7-dof Franka Emika Panda robot were used for both partner side and operator side, but only the operator side was tested. It should be appreciated that a wide range of other robotic devices may be used, and the 7-dof Franka Emika Panda robot does not limit the applications of the proposed systems.

Initially, the robots were attached to a base in a symmetrical manner. The robots were provisioned with 6-dof force/torque (F/T) sensors (SensONE, Bota Systems) that were attached to their "wrists". Furthermore, the operator's robot was equipped with a robotic hand (SoftHand2 Research, qbrobotics) to allow for an easy grasp by the operator. The set up was arranged to allow for a pHHI experience from both ends.

The following tests were conducted to validate the performance of the proposed passivity techniques disclosed herein: (1) Operator moves the end-effector to draw a vertical '8' in stable condition; (2) Operator moves the end-effector to draw a horizontal line toward the base and back in stable condition; (3) Operator moves the end-effector to draw a horizontal line toward the base and back in an unstable condition; and (4) Operator moves the end-effector to draw two horizontal lines toward the base and back in an unstable condition.

The priorities of the implemented tasks for the operator (O) and partner (P) are shown in Table I below.

TABLE 1

| Task | Priority (O) | Priority (P) |
|---|---|---|
| Equations of Motion | 1 | 1 |
| Joint Limits | 1 | 1 |
| Task Space Constraints | 2 | 3 |
| Interaction Force Constraints | 3 | 2 |
| Passivity constraints and control | 4 | N/A |
| End-Effector Acceleration Tracking | 4 | 4 |
| Joint Acceleration Minimization | 5 | 5 |

Figure 5A:
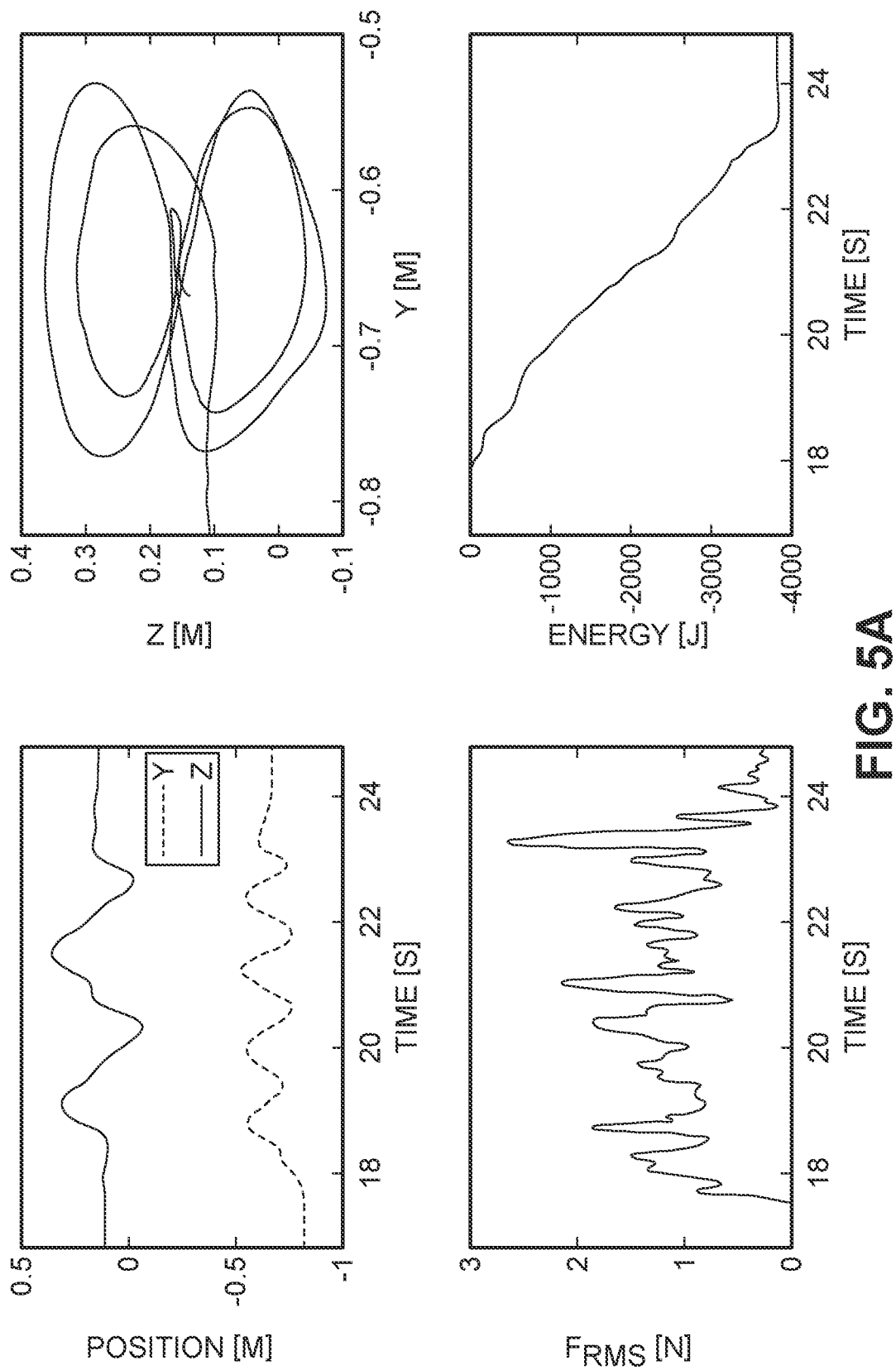
FIG. 5A is a graph presenting the end-effector positions of an operator's robots while the operator draws the numeral '8' in the stable condition without a passivity framework, according to an embodiment.
Figure 5B:
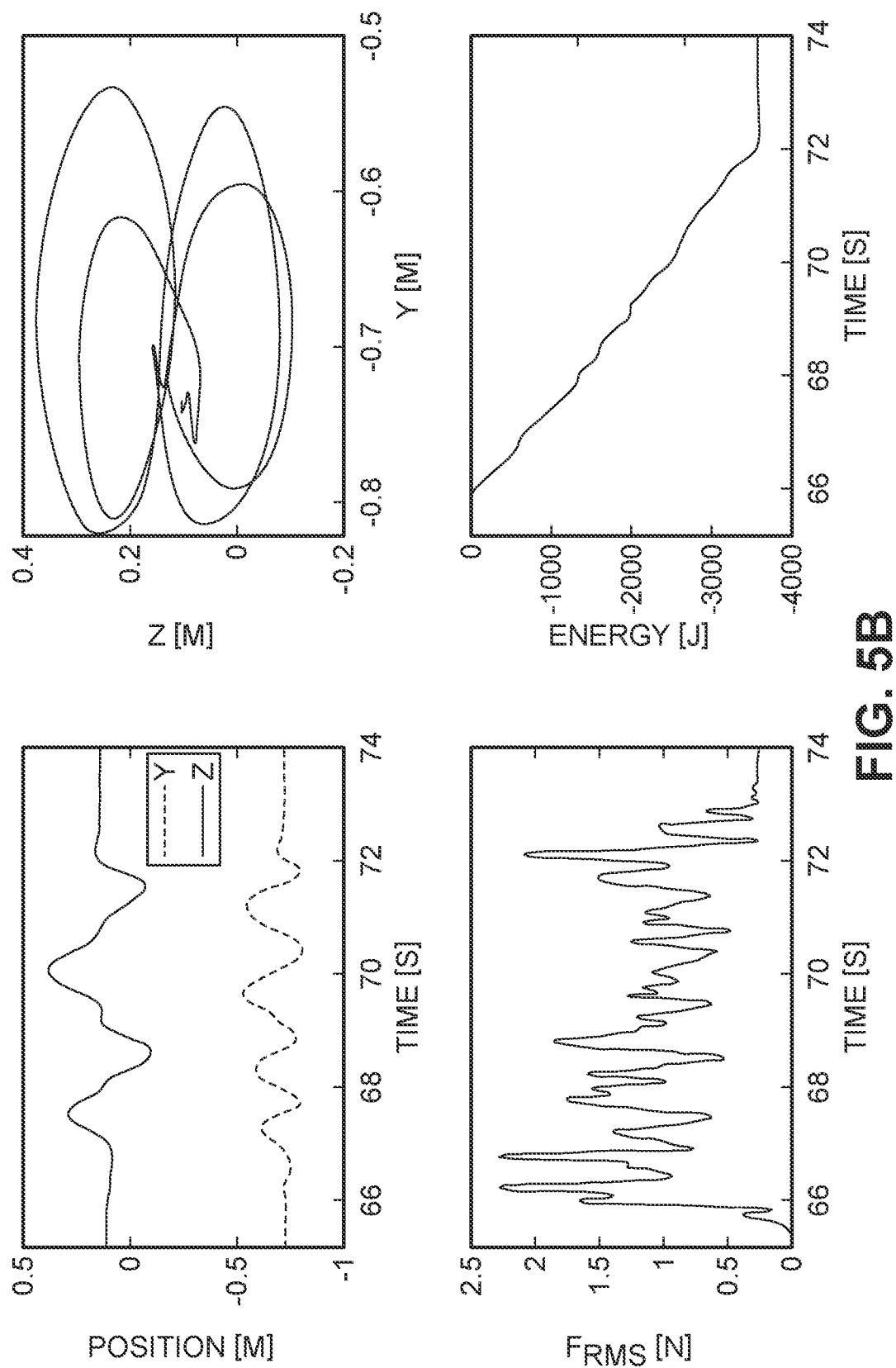
FIG. 5B is a graph presenting the end-effector positions of an operator's robot while the operator draws the numeral '8' in the stable condition with a passivity framework, according to an embodiment.

Referring now to FIGS. 5A-6B, the results of some of the performed tests are depicted graphically. In FIGS. 5A and 5B, the end-effector positions (y-z) of the operator's robots while the operator draws '8' in the stable condition (a) without the passivity framework (FIG. 5A) and (b) including an embodiment of the passivity framework (without back-up controls) (FIG. 5B) are shown. As may be seen across these eight graphs, the position response is stable and transparent in both conditions, and the interaction force and user effort have similar range and energy is decreasing and negative in both condition. In other words, the passivity framework does not impact or detract from system performance. Similar results were also obtained that validated the degree of transparency and user effort, where both aspects remained stable when employing the passivity framework. In other words, the passivity framework was able to stabilize an unstable condition and provide comfort and a stable interaction for the user.

Figure 6A:
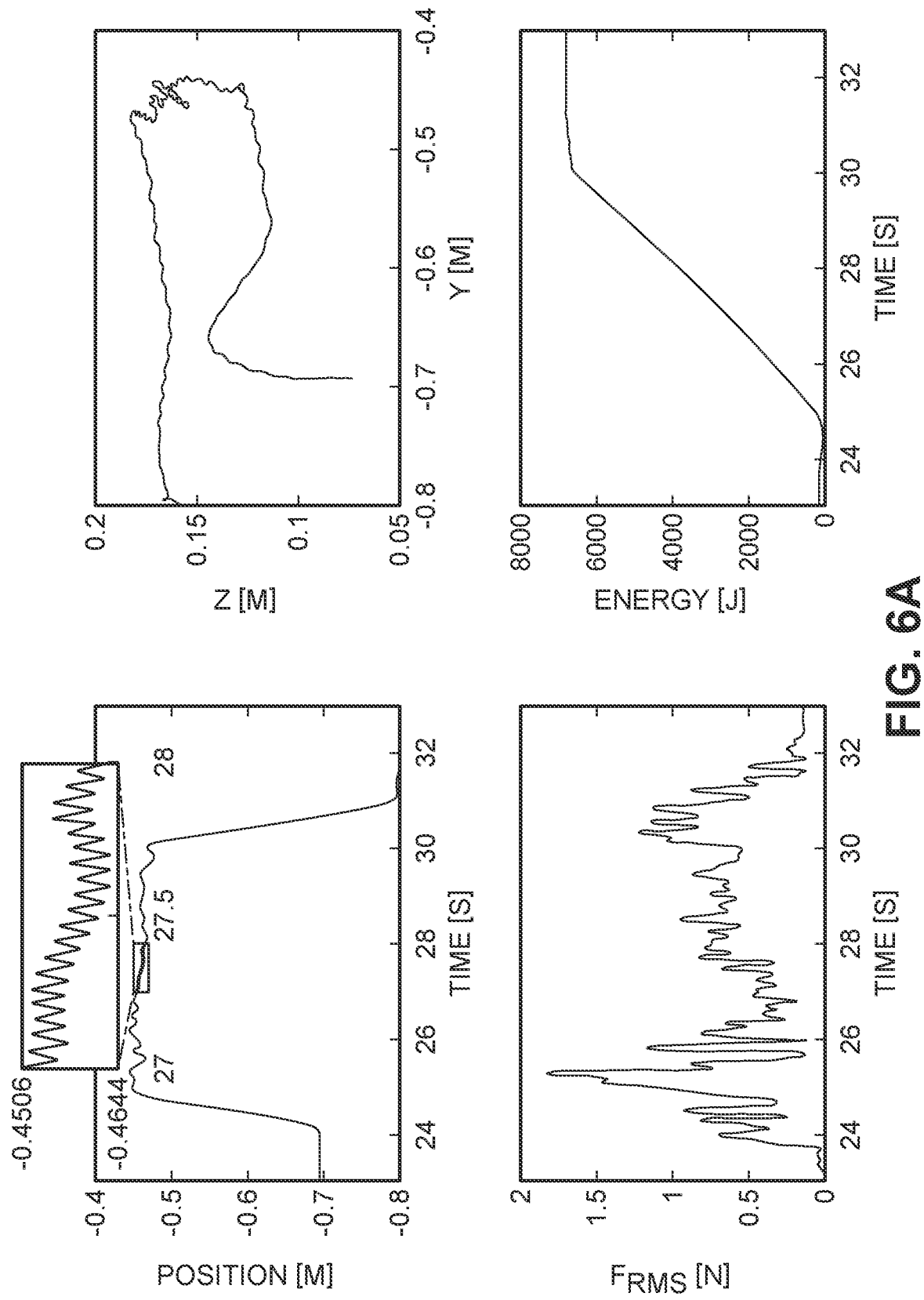
FIG. 6A is a graph presenting the end-effector positions of an operator's robot while the operator draws a line in a stable condition without a passivity framework, according to an embodiment.
Figure 6B:
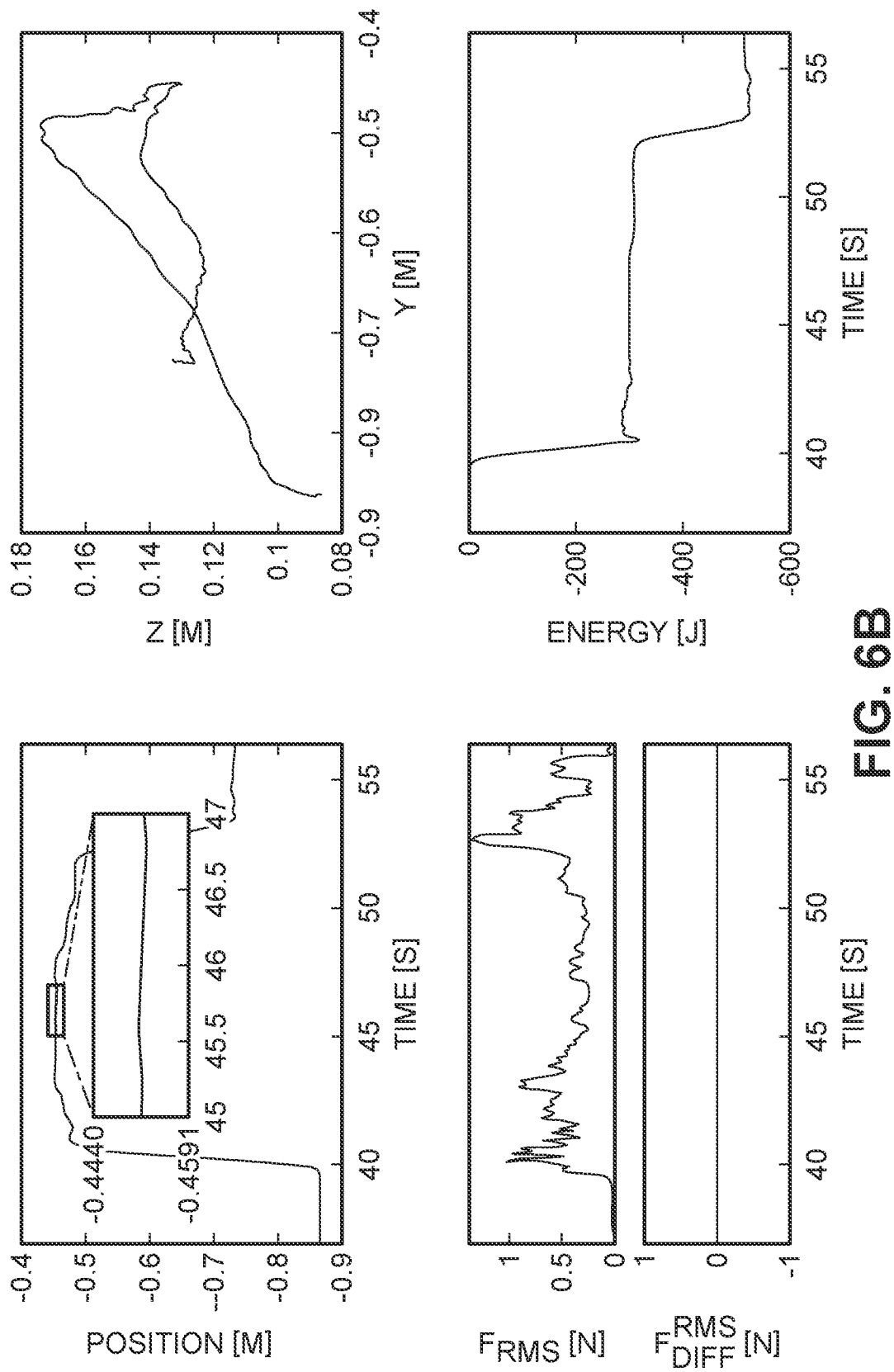
FIG. 6B is a graph presenting the end-effector positions of an operator's robot while the operator draws a line in an stable condition with a passivity framework, according to an embodiment.

Moving now to FIGS. 6A and 6B, the end effector positions (y) of the operator's robot while the operator draws a line toward the base and back in the unstable condition (a) without the passivity framework (FIG. 6A), and (b) including an embodiment of the passivity framework (without back-up controls) (FIG. 6B) are shown. To provide the unstable condition, the virtual mass was reduced.

As may be seen across these eight graphs, it is clear that without a passivity framework (FIG. 6A), the position response is oscillatory. The energy is increasing, indicating that the system is not passive and could not remain passive. However, with the passivity framework (FIG. 6B), the position response has no oscillation and may be used to prevent energy from increasing/becoming positive, thereby maintaining the passivity of the system. In FIG. 6B, $F_{diff}$ shows whether any opposing force was applied from the back-up passivity control to the user to extract energy from the user. In this case, zero in $F_{diff}$ means that the passivity constraints alone (through the hierarchical optimization solution) could keep the energy negative and the keep the system passive. Thus in this example, the back-up passivity controls were not required.

Similar results were also obtained when the operator drew two lines toward the base and back in the unstable condition. Again, without a passivity framework, the position response showed nonstop oscillation, while energy increased and became positive, such that passivity could not be satisfied. However, in the same set-up incorporating the proposed passivity framework, there were smaller oscillations initially, and as time passed, the oscillation was dampened and then removed. In addition, energy remained negative. It should be appreciated that even if the energy had begun to increase (e.g., due to the highly unstable condition that the system is operating in), the passivity framework would prevent the energy from becoming positive and therefore keep the system passive and comfortable for the user. The back-up passivity control could be activated to extract energy from the user to fill the required energy so that the system could remain passive. Additionally, the maximum interaction force without the passivity framework was shown to be more than twice more than the interaction force with the passivity framework, showing a reduction in reduce user-effort during unstable conditions.

As described herein, a passivity framework that may prioritize among different constraints and enable the system to dynamically change the priorities of the constraints may facilitate improved stability and comfort in robot-mediated human-human interactions across many settings. The framework guarantees passivity and stability without sacrificing performance, transparency, and comfort. The proposed method could provide a high magnitude of passivity control for bilateral physical interactions with minimal modifications of the original structure. Furthermore, the proposed methods do not rely on any expertise on the part of the participants, and is not limited to specific teleoperation application.

Figure 7:
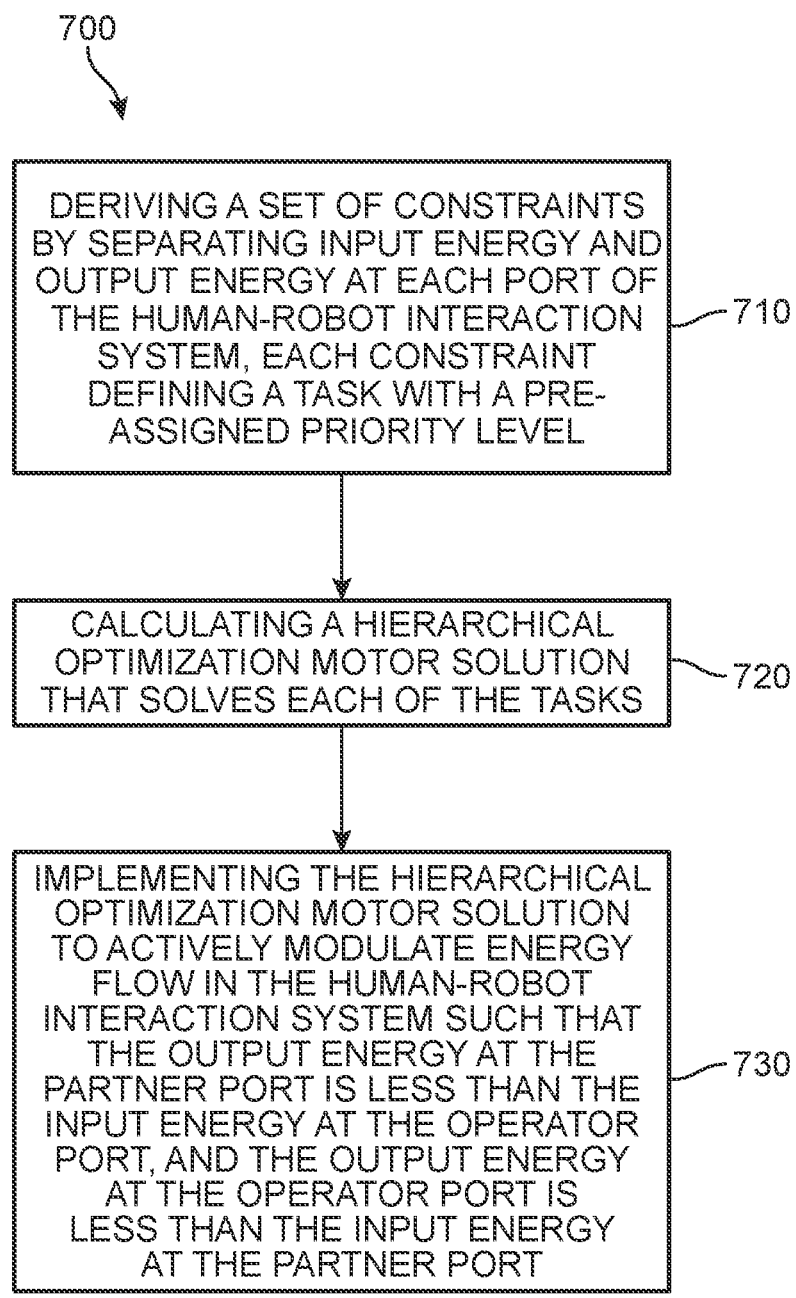
FIG. 7 is a flow chart depicting a method of stabilizing a bilateral human-robot interaction system that includes an operator port and a partner port, according to an embodiment.

FIG. 7 is a flow chart illustrating an embodiment of a method 700 of stabilizing a bilateral human-robot interaction system that includes an operator port and a partner port to improve comfort of human participants. At 710, the method may include deriving a set of constraints by separating input energy and output energy at each port of the human-robot interaction system, wherein each of the constraints defines a task with a pre-assigned priority level. At 720, the method includes calculating, by each robot of the human-robot interaction system, a hierarchical optimization motor solution that solves each of the tasks starting from the highest-priority task and progressing sequentially through lower-priority tasks. The method 700 also includes at 730, implementing, via a motor of a first robot of the human-robot interaction system, the hierarchical optimization motor solution to actively modulate energy flow in the human-robot interaction system such that the output energy at the partner port is less than the input energy at the operator port, and the output energy at the operator port is less than the input energy at the partner port during use of the human-robot interaction system.

In different embodiments, the method 700 may include additional processes or aspects. In one example, the method also includes implementing, via a motor of a second robot of the human-robot interaction system, the hierarchical optimization solution. In some embodiments, each constraint of the set of constraints is directed to one of robot joint limits, task space constraints, end-effector acceleration tracking, equations of motion, and joint acceleration minimization. In another example, the method includes modulating a virtual damper to extract energy from each user into the system. In some embodiments, the method further includes calculating end-effector accelerations as equality constraints; and implementing the end-effector accelerations at the operator port, thereby causing the first robot to track the forces generated from the partner port as well as any constraints associated with the partner port. In different embodiments, the method may include calculating end-effector accelerations as equality constraints; and implementing the end-effector accelerations at the partner port, thereby causing the first robot to track the forces generated from the operator port as well as any constraints associated with the operator port. In one embodiment, the human-robot interaction system includes the first robot and a second robot that is in a remote location relative to the first robot. In another embodiment, the human-robot interaction system is used by a physical therapist at the operator port to administer physical therapy to a participant at the partner port. In some embodiments, the human-robot interaction system is used by a sports coach at the operator port to provide physical instructions to a participant at the partner port.

Other methods and systems may be contemplated within the scope of the present disclosure. For example, in some embodiments, a human-robot interaction system including a passivity framework is disclosed. The system may include a bilateral controller communication network to facilitate the transfer of energy between a first port and a second port. In addition, the system includes the first port which further includes a first robot that is controlled by a human operator, the first robot employing a first hierarchical optimization module that modulates a flow of energy between the first robot and the bilateral controller communication network such that energy supplied by the human operator via the first robot into the first port is always greater than or equal to energy that is output to the second port. The system also comprises the second port that includes a second robot that is controlled by a human partner, the second robot employing a second hierarchical optimization module that modulates a flow of energy between the second robot and the bilateral controller communication network such that energy supplied by the human follwer via the second robot into the second port is always greater than or equal to energy that is output to the first port. In some embodiments, the system further includes a back-up passivity control (e.g., at each port) that applies an opposing force by modulating a virtual damper that extracts energy from that side of the system.

As a general matter, an embodiment of a server or other computing system for a passivity framework is described below. As a general matter, the server may include circuitry, a memory, an I/O device, and a network interface. The circuitry may be coupled to the memory, the I/O device, and the network interface, through wired or wireless connections of the communication networks.

The circuitry may include suitable logic, circuitry, and/or interfaces that may be configured to execute program instructions associated with different operations to be executed by the server. For example, some of the operations may include, but are not limited to, reception of electric charging information from the transfer devices, transmission of the received electric charging information from each of the transfer devices to the electronic device associated with the energy regulatory authority, reception of the renewable credit information from the electronic device based on the transmitted electric charging information, and transmission of the first credit information to each of the transfer devices.

The circuitry may include any suitable special-purpose or general-purpose computer, computing entity, or processing device including various computer hardware or software modules and may be configured to execute instructions stored on any applicable computer-readable storage media (for example the memory). The circuitry may be implemented based on a number of processor technologies known in the art. For example, the circuitry may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry may include any number of processors configured to, individually or collectively, perform any number of operations of the server, as described in the present disclosure. Examples of the circuitry may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory may include suitable logic, circuitry, interfaces, and/or code that may be configured to store the set of instructions executable by the circuitry. The memory may be configured to store the registration information for the transfer devices. The memory may be further configured to store the electric charging information, the renewable credit information, and the monetary information. Examples of implementation of the memory may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device may include suitable logic, circuitry, interfaces, and/or code that may be configured to receive user inputs and generate outputs in response to the received user inputs. The I/O device may receive the registration information associated with a new electric charging facility device as the user-input. For example, the server may receive the user-input from an executive of the organization associated with or handling the server for the credit management. The registration information may indicate a unique identifier or a location where the new electric charging facility device is positioned. The I/O device may include various input and output devices, may be configured to communicate with the circuitry. Examples of the I/O device may include, but are not limited to, a touch screen, a keyboard, a mouse, a joystick, a microphone, a display device, a speaker, and/or an image sensor.

The network interface may include suitable logic, circuitry, and interfaces that may be configured to facilitate communication between the circuitry, the electric charging facility devices, the electronic device of the energy regulatory authority, the electric grid device of the electric grid, the communication device of the renewable energy generation sources, and the electronic apparatus of the vehicle, via the communication network. The network interface may be implemented by use of various known technologies to support wired or wireless communication of the server with the communication network. The network interface may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a protocol for email, instant messaging and a Short Message Service (SMS).

While the server in this case includes the circuitry, the memory, the I/O device, and the network interface, the disclosure should not be construed as limiting the server and may include more or less components to perform the same or other functions of the server. Details of the other functions and the components have been omitted from the disclosure for the sake of brevity. The functions or operations executed by the server may be performed by the circuitry. It should be understood that the server may be combined with the transfer devices to form a system. The transfer devices may be communicably coupled with the network Interface, via a communication network.

The following includes definitions of selected terms employed herein. The definitions include various examples and/or forms of components that fall within the scope of a term and that may be used for implementation. The examples are not intended to be limiting. Aspects of the present disclosure may be implemented using hardware, software, or a combination thereof and may be implemented in one or more computer systems or other processing systems. In one example variation, aspects described herein may be directed toward one or more computer systems capable of carrying out the functionality described herein. An example of such a computer system includes one or more processors. A "processor", as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

The processor may be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

Computer system may include a display interface that forwards graphics, text, and other data from the communication infrastructure (or from a frame buffer) for display on a display unit. Display unit may include display, in one example. Computer system also includes a main memory, e.g., random access memory (RAM), and may also include a secondary memory. The secondary memory may include, e.g., a hard disk drive and/or a removable storage drive, representing a floppy disk drive, a magnetic tape drive, an optical disk drive, etc. The removable storage drive reads from and/or writes to a removable storage module in a well-known manner. Removable storage module, represents a floppy disk, magnetic tape, optical disk, etc., which is read by and written to removable storage drive. As will be appreciated, the removable storage module includes a computer usable storage medium having stored therein computer software and/or data.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals, which may be electronic, electromagnetic, optical or other signals capable of being received by communications interface. These signals are provided to communications interface via a communications path (e.g., channel). This path carries signals and may be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein may be directed to such computer program products. Communications device may include communications interface.

Computer programs (also referred to as computer control logic) are stored in main memory and/or secondary memory. Computer programs may also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In variations where aspects described herein are implemented using software, the software may be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps or processes. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art may readily appreciate that the sequences may be varied and still remain within the spirit and scope of the present embodiments.

The invention claimed is:

1. A method for stabilizing a bilateral human-robot interaction system that includes an operator port and a partner port, the method comprising:

deriving a set of constraints by separating input energy and output energy at each port of the human-robot interaction system, wherein each of the constraints defines a task with a pre-assigned priority level;

calculating, by each robot of the human-robot interaction system, a hierarchical optimization motor solution that solves each of the tasks starting from the highest-priority task and progressing sequentially through lower-priority tasks; and implementing, via a motor of a first robot of the human-robot interaction system, the hierarchical optimization motor solution to actively modulate energy flow in the human-robot interaction system such that the output energy at the partner port is less than the input energy at the operator port, and the output energy at the operator port is less than the input energy at the partner port during use of the human-robot interaction system.

2. The method of claim 1, further comprising implementing, via a motor of a second robot of the human-robot interaction system, the hierarchical optimization solution.

3. The method of claim 1, wherein each constraint of the set of constraints is directed to one of robot joint limits, task space constraints, end-effector acceleration tracking, equations of motion, and joint acceleration minimization.

4. The method of claim 1, further comprising modulating a virtual damper to extract energy from each user into the system.

5. The method of claim 1, further comprising:
calculating end-effector accelerations as equality constraints; and
implementing the end-effector accelerations at the operator port, thereby causing the first robot to track the forces generated from the partner port as well as any constraints associated with the partner port.

6. The method of claim 1, further comprising:
calculating end-effector accelerations as equality constraints; and
implementing the end-effector accelerations at the partner port, thereby causing the first robot to track the forces generated from the operator port as well as any constraints associated with the operator port.

7. The method of claim 1, wherein the human-robot interaction system includes the first robot and a second robot that is in a remote location relative to the first robot.

8. The method of claim 1, wherein the human-robot interaction system is used by a physical therapist at the operator port to administer physical therapy to a participant at the partner port.

9. The method of claim 1, wherein the human-robot interaction system is used by a sports coach at the operator port to provide physical instructions to a participant at the partner port.

10. A system for stabilizing a bilateral human-robot interaction system that includes an operator port and a partner port, the system comprising a processor and machine-readable media including instructions which, when executed by the processor, cause the processor to:

derive a set of constraints by separating input energy and output energy at each port of the human-robot interaction system, wherein each of the constraints defines a task with a pre-assigned priority level;

calculate, by each robot of the human-robot interaction system, a hierarchical optimization motor solution that solves each of the tasks starting from the highest-priority task and progressing sequentially through lower-priority tasks; and implement, via a motor of a first robot of the human-robot interaction system, the hierarchical optimization motor solution to actively modulate energy flow in the human-robot interaction system such that the output energy at the partner port is less than the input energy at the operator port, and the output energy at the operator port is less than the input energy at the partner port during use of the human-robot interaction system.

11. The system of claim 10, wherein the instructions further cause the processor to implement, via a motor of a second robot of the human-robot interaction system, the hierarchical optimization solution.

12. The system of claim 10, wherein each constraint of the set of constraints is directed to one of robot joint limits, task space constraints, end-effector acceleration tracking, equations of motion, and joint acceleration minimization.

13. The system of claim 10, wherein the instructions further cause the processor to modulate a virtual damper to extract energy from each user into the system.

14. The system of claim 10, wherein the instructions further cause the processor to:
calculate end-effector accelerations as equality constraints; and
implement the end-effector accelerations at the operator port, thereby causing the first robot to track the forces generated from the partner port as well as any constraints associated with the partner port.

15. The system of claim 10, wherein the instructions further cause the processor to:
calculate end-effector accelerations as equality constraints; and
implement the end-effector accelerations at the partner port, thereby causing the first robot to track the forces generated from the operator port as well as any constraints associated with the operator port.

16. The system of claim 10, wherein the human-robot interaction system includes the first robot and a second robot that is in a remote location relative to the first robot.

17. The system of claim 10, wherein the human-robot interaction system is used by a physical therapist at the operator port to administer physical therapy to a participant at the partner port.

18. The system of claim 10, wherein the human-robot interaction system is used by a sports coach at the operator port to provide physical instructions to a participant at the partner port.

19. A human-robot interaction system including a passivity framework, the system comprising:

a bilateral controller communication network to facilitate the transfer of energy between a first port and a second port;

the first port, including a first robot that is controlled by a human operator, the first robot employing a first hierarchical optimization module that modulates a flow of energy between the first robot and the bilateral controller communication network such that energy supplied by the human operator via the first robot into the first port is always greater than or equal to energy that is output to the second port; and the second port, including a second robot that is controlled by a human partner, the second robot employing a second hierarchical optimization module that modulates a flow of energy between the second robot and the bilateral controller communication network such that energy supplied by the human follower via the second robot into the second port is always greater than or equal to energy that is output to the first port.

20. The system of claim 19, further comprising a back-up passivity control that applies an opposing force by modulating a virtual damper that extracts energy from one side of the system.

* * * * *